US012602065B2

(12) United States Patent
Shatters et al.

(10) Patent No.: US 12,602,065 B2
(45) Date of Patent: Apr. 14, 2026

(54) DERATING OF REMOTELY CONTROLLED WORK MACHINES BASED ON GEOCACHED CONNECTIVITY INFORMATION

(71) Applicant: Caterpillar Inc., Peoria, IL (US)

(72) Inventors: Aaron R. Shatters, Montgomery, IL (US); Eric W. Cler, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 117 days.

(21) Appl. No.: 18/417,450

(22) Filed: Jan. 19, 2024

(65) Prior Publication Data

US 2025/0238040 A1 Jul. 24, 2025

(51) Int. Cl.
| | |
|---|---|
| *G05D 1/80* | (2024.01) |
| *E02F 9/20* | (2006.01) |
| *G05D 1/221* | (2024.01) |
| *G05D 111/30* | (2024.01) |
| *H04B 17/318* | (2015.01) |
| *H04W 4/021* | (2018.01) |
| *H04W 4/40* | (2018.01) |
| *G05D 107/70* | (2024.01) |

(52) U.S. Cl.
CPC ............... *G05D 1/80* (2024.01); *E02F 9/205* (2013.01); *G05D 1/221* (2024.01); *H04B 17/328* (2023.05); *H04W 4/021* (2013.01); *H04W 4/40* (2018.02); *G05D 2107/70* (2024.01); *G05D 2111/30* (2024.01)

(58) Field of Classification Search
CPC ...... G05D 1/80; G05D 1/221; G05D 2107/70; G05D 2111/30; E02F 9/205; H04B 17/328; H04W 4/021; H04W 4/40
See application file for complete search history.

(56) References Cited

U.S. PATENT DOCUMENTS

| | | | |
|---|---|---|---|
| 6,625,135 | B1 | 9/2003 | Johnson et al. |
| 7,819,312 | B2 | 10/2010 | Gualandri |
| 9,340,214 | B2 | 5/2016 | Funke et al. |
| 9,761,066 | B2 | 9/2017 | Chen et al. |
| 11,112,805 | B2 | 9/2021 | Dulmage et al. |

(Continued)

FOREIGN PATENT DOCUMENTS

| | | |
|---|---|---|
| WO | 2020132305 A1 | 6/2020 |
| WO | 2021193073 A1 | 9/2021 |

*Primary Examiner* — Ashley L Redhead, Jr.

(57) ABSTRACT

When a remotely controlled work machine loses a wireless connection on a work site, operation of the work machine should be terminated for safety purposes. However, if the work machine is moving when the wireless connection is lost, the work machine will continue moving for some time due to inertia. Accordingly, embodiments predict the signal quality of a wireless connection as a work machine approaches a new geographical location. When the predicted signal quality is low, the work machine may be proactively derated before it enters the geographical location. After entering the geographical location, if the actual signal quality is significantly better than the predicted signal quality, the work machine may be rerated. The predicted signal qualities may be determined based on a signal map that is independently maintained and updated by each work machine, so as to evolve over time with the work site and the work machine.

20 Claims, 5 Drawing Sheets

(56)          References Cited

U.S. PATENT DOCUMENTS

| | | | |
|---|---|---|---|
| 2015/0271729 A1* | 9/2015 | Sirotkin | H04W 36/302 |
| | | | 370/332 |
| 2018/0017973 A1* | 1/2018 | Teague | G05D 1/0088 |
| 2019/0155278 A1* | 5/2019 | Idbrant | G01S 13/765 |
| 2022/0222392 A1* | 7/2022 | Ishihara | G06F 30/20 |

* cited by examiner

400

500

DERATING OF REMOTELY CONTROLLED WORK MACHINES BASED ON GEOCACHED CONNECTIVITY INFORMATION

TECHNICAL FIELD

The embodiments described herein are generally directed to remotely controlled work machines, and, more particularly, to the derating of remotely controlled work machines based on geocached connectivity information.

BACKGROUND

Remotely controlled work machines at work sites require wireless communications, during operation, to receive commands issued to the work machine by a remote operator and/or provide feedback from the work machine to the remote operator. A work machine can operate at full capability with wireless communication. However, as soon as the wireless communication is lost, the work machine becomes inoperable. This can be especially dangerous if the work machine is moving when it loses wireless communication, since it will take some time for the work machine to slow to a stop due to inertia. During that time, the work machine is not under the control of an operator.

U.S. Pat. No. 11,112,805 B2 describes a vehicle control system that, when a communication loss occurs, restricts operation of a vehicle until communication is reestablished. However, it can be dangerous to allow the vehicle to continue operating without wireless communications.

Thus, the robustness of wireless communications at a work site is a major concern. A typical solution is to install fixed wireless access points at one or more locations on the work site to provide wireless communication coverage for the work machines operating at the work site. However, the availability of wireless communications at any given location on the work site is generally unknown to the work machine and can change over time as the landscape of the work site changes (e.g., during a mining, construction, forestry, or farming operation). The present disclosure is directed toward overcoming one or more of the problems discovered by the inventors.

SUMMARY

In an embodiment, a method comprises, by a controller in a work machine: determining that the work machine is approaching a new geographical location; based on determining that the work machine is approaching the new geographical location, determining a predicted signal quality associated with the new geographical location; determining whether the predicted signal quality satisfies one or more derating criteria; and based on determining that the predicted signal quality satisfies at least one of the one or more derating criteria, derating at least one operational parameter of the work machine.

In an embodiment, a work machine comprises: a machine body; a work implement; one or more ground-engaging members; an antenna; and a controller configured to determine that the work machine is approaching a new geographical location, based on determining that the work machine is approaching the new geographical location, determine a predicted signal quality associated with the new geographical location based on a signal map, determine whether the predicted signal quality satisfies one or more derating criteria, based on determining that the predicted signal quality satisfies at least one of the one or more derating criteria, derate at least one operational parameter of the work machine, determine that the work machine has entered the new geographical location, detect an actual signal quality at the antenna within the new geographical location; determine to adjust the rate of the work machine based on the actual signal quality, based on determining to adjust a rate of the work machine based on the actual signal quality, derate or rerate the at least one operational parameter of the work machine, and modify the signal map based on the actual signal quality.

In an embodiment, a method comprises, by a controller in a work machine: determining whether the work machine is approaching a new geographical location; based on determining that the work machine is approaching the new geographical location, derating at least one operational parameter of the work machine; determining that the work machine has entered the new geographical location; detecting an actual signal quality within the new geographical location; determining whether the actual signal quality satisfies one or more rerating criteria; and based on determining that the actual signal quality satisfies at least one of the one or more rerating criteria, rerating the at least one operational parameter of the work machine.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
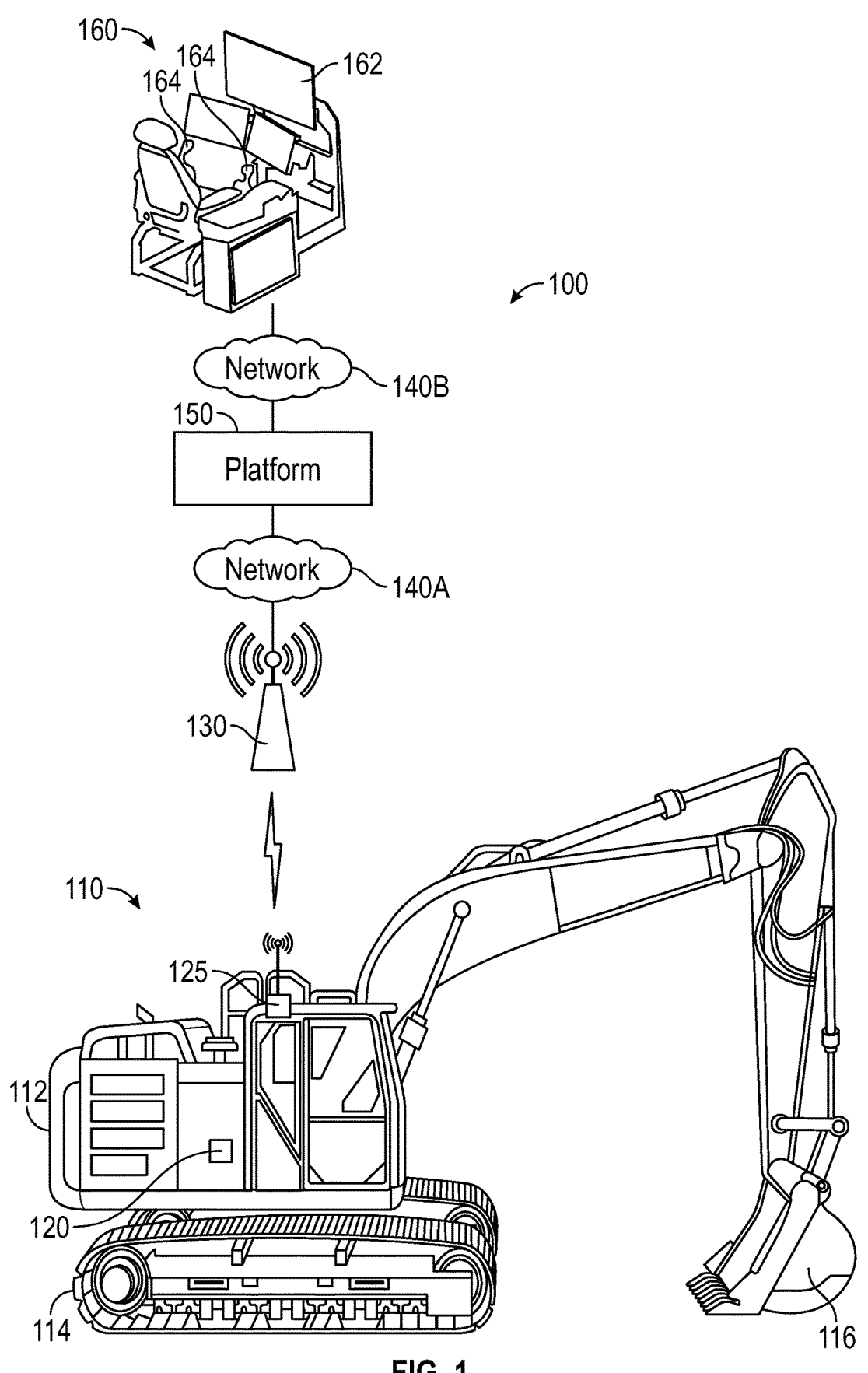
FIG. 1 illustrates remote control of a work machine in a machine environment, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

As used herein, a reference numeral with an appended letter will be used to refer to a specific component, whereas the same reference numeral without any appended letter will be used to refer collectively to a plurality of the component or to refer to a generic or arbitrary instance of the component. In addition, the terms "respective" and "respectively" signify an association between members of a group of first items and members of a group of second items. For example, the phrase "each component A connected to a respective component B" would signify A1 connected to B1, A2 connected to B2, and so on and so forth, up to AN connected to BN.

FIG. 1 illustrates remote control of a work machine 110 in a machine environment 100, according to an embodiment. Machine environment 100 may include an environment, including a work site, in which one or more work machines 110 perform a task associated within an industry, such as mining, construction, forestry, transportation, energy exploration, farming, or the like. For example, machine environment 100 could include one or more mine sites in which a plurality of work machines 110 cooperate to perform a task associated with mining. However, it should be understood that disclosed embodiments are not limited to any particular environment. In addition, while work machine 110 is illustrated as an excavator, it should be understood that work machine 110 may be any type of mobile equipment, including a wheel loader, dump truck, asphalt paver, backhoe loader, skid steer, track loader, cold planer, compactor, bulldozer, electric rope shovel, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.). While work machine 110 could also be non-mobile equipment, the disclosed embodiments primarily benefit equipment that is remotely controlled to move throughout machine environment 100.

In the illustrated example, work machine 110 comprises a machine body 112 and one or more ground-engaging members 114. Machine body 112 may comprise a cabin, an internal combustion engine or electric motor (e.g., driven by a battery pack), and/or the like. The cabin may comprise a seat for an operator, controls (e.g., one or more joysticks, a console comprising an integrated display with inputs, etc.), and/or the like. Ground-engaging members 114 are illustrated as tracks, but may comprise other types of components for moving machine body 112 with respect to the ground, such as wheels, rollers, and/or the like. Ground-engaging members 114 may be driven by a drivetrain, which is in turn driven by an internal combustion engine or electric motor.

Work machine 110 may also comprise a work implement 116. Work implement 116 is illustrated as an arm and bucket. However, work implement 116 may comprise any other type of tool, such as other types of buckets (e.g., a bucket for a backhoe, compact wheel loader, loader, mining shovel, skid steer, telehandler, underground loader, etc.), a blade, a ripper, a shovel, a dump body, a drill, a grader, a backhoe, an auger, a bale grabber, a bale spear, a broom, a brush-cutter, a cold planer, a compactor, a flail mower, a fork, a grapple, a hammer, a mulcher, a pulverizer, a rake, a rotary cutter, a rotor, a saw, shears, a stump grinder, a tiller, a trencher, a water delivery system, and/or the like. Alternatively, work machine 110 may be a vehicle with no work implement.

Work machine 110 may comprise a controller 120, which may be an electronic control unit (ECU). Controller 120 may be communicatively coupled (e.g., via wired or wireless communications) to one or a plurality of sensors and/or one or a plurality of subsystems of work machine 110. Controller 120 may collect data from the sensor(s) and/or subsystem(s) of work machine 110 and process the collected data. Processing the collected data may comprise determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. Controller 120 may also control the operation of one or more subsystems of work machine 110 based on the collected data and/or operator commands. For example, controller 120 may be communicatively coupled to a fuel injection system associated with the engine of work machine 110. Controller 120 may receive an operator command (e.g., increase throttle) and provide command signals to the fuel injection system, which may responsively increase the flow of fuel from a fuel supply to the engine. The engine may be connected to a torque converter that transmits power from the engine to a transmission of the drivetrain that drives ground-engaging members 114, to thereby move work machine 110 with respect to the ground.

The sensor(s) may include any type of sensor or sensor array capable of measuring values of one or more parameters of one or more subsystems of work machine 110 and/or machine environment 100. Examples of such parameters include, without limitation, position(s) of work implement 116, engine speed, machine speed, pressure of a fluid (e.g., fuel, oil, coolant, hydraulic fluid, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, and/or the like. In an embodiment, the sensor(s) include a receiver of a Global Navigation Satellite System (GNSS), such as the Global Positioning System (GPS), which can be utilized to determine a location (e.g., in GPS coordinates) of work machine 110. The sensor(s) may also include one or more cameras (e.g., regular or stereo cameras), radar systems (e.g., a Light Detecting and Ranging (LiDAR) system), and/or the like, to aid in the navigation of machine environment 100.

Work machine 110 may comprise a communication module 125, which may be separate or integral to controller 120. Communication module 125 may comprise hardware and/or software that enables communication between communication module 125 and an access point 130 of a network 140A. For example, communication module 125 may comprise or be connected to a processor, network interface, and wireless transceiver with an antenna that enables wireless communication with an access point 130 of a cellular network. Communication module 125 may send data to a platform 150 and/or receive data from platform 150 via network 140A. For example, controller 120 may transmit any of the data that are collected (e.g., from sensor(s) in work machine 110) or derived from collected data to platform 150 via communication module 125, as well as receive data, such as control commands, from platform 150 via communication module 125.

In an embodiment, information collected by the sensor(s) in work machine 110 may be relayed (e.g., with or without pre-processing) to an external system, and, in the illustrated embodiment, through platform 150 to a remote terminal 160. Platform 150 may host and/or execute one or more of the various functions, processes, methods, and/or software modules described herein. Platform 150 may comprise dedicated servers or may instead be implemented in a computing cloud, in which the resources of one or more servers are dynamically and elastically allocated to multiple tenants based on demand. These servers may be collocated (e.g., in a single data center) and/or geographically distributed (e.g., across multiple data centers). Platform 150 may be communicatively connected to work machine 110 via network 140A and/or a remote terminal 160 via network 140B. Networks 140A and 140B (which may be collectively referred to herein as network 140) may be the same network, separate and distinct networks, or overlapping networks, and may include one or more cellular networks, one or more satellite networks, the Internet, one or more intranets, and/or the like. While only a single instance of work machine 110 and a single instance of remote terminal 160 are illustrated, it should be understood that platform 150 may be communicatively coupled to any number of work machines 110 and remote terminals 160.

Platform 150 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 150 transmits or serves one or more screens of the graphical user interface in response to requests from work machine 110 via network 140A and/or remote terminal 160 via network 140B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 150 may receive requests from external systems, and provide responses in extensible Markup Language (XML), JavaScript Object Notation (JSON), and/or any other suitable or desired format. In such embodiments, platform 150 may provide an application programming interface (API) (e.g., implemented with a Representation State Transfer (REST) architecture) which defines the manner in which work machine 110, remote terminal 160, and/or other external system(s) may interact with the web service. Thus, work machine 110, remote terminal 160, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 160, may interact with platform 150 to execute one or more or a portion of one or more of the various functions, processes, methods, and/or software modules described herein. In this case, the client application may generate the graphical user interface and access functionality on platform 150 via the API.

Remote terminal 160 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 160 is a remote operating station by which a remote operator can control work machine 110 through platform 150. In an alternative embodiment, remote terminal 160 may communicate directly with work machine 110 (i.e., without platform 150 acting as intermediary) to operate work machine 110. In either case, remote terminal 160 may comprise one or more displays 162 that display, in real time, video captured by camera(s) mounted on work machine 110 and transmitted by communication module 125 of work machine 110.

Remote terminal 160 may also comprise one or more input devices 164 (e.g., joysticks) that enable a remote operator to provide operating controls to work machine 110. These operating controls may be transmitted as control commands, directly or via platform 150, to communication module 125, which may relay the control commands to controller 120. Controller 120 may responsively control the appropriate subsystem of work machine 110 in accordance with the control commands. In general, for safety reasons, each remote terminal 160 should control one work machine 110 at a time. However, this is not a requirement of any embodiment. As illustrated, display(s) 162 and input(s) 164 may be configured to simulate the cabin within work machine 110.

Platform 150 will generally be described herein as supporting remote terminal 160, by which a remote human operator operates work machine 110. However, it should be understood that, in an alternative embodiment, platform 150 may operate work machine 110 autonomously, without any human operator, in which case remote terminal 160 may be omitted. During autonomous operation, platform 150 may receive data from work machine 110, generate and send a work plan for work machine 110 to follow, generate and send control commands to work machine 110, and/or the like. Controller 120 of work machine 110 may send data, receive the work plan, receive the control commands, and/or the like, from platform 150, and operate work machine 110 autonomously, based on the received information.

Figure 2:
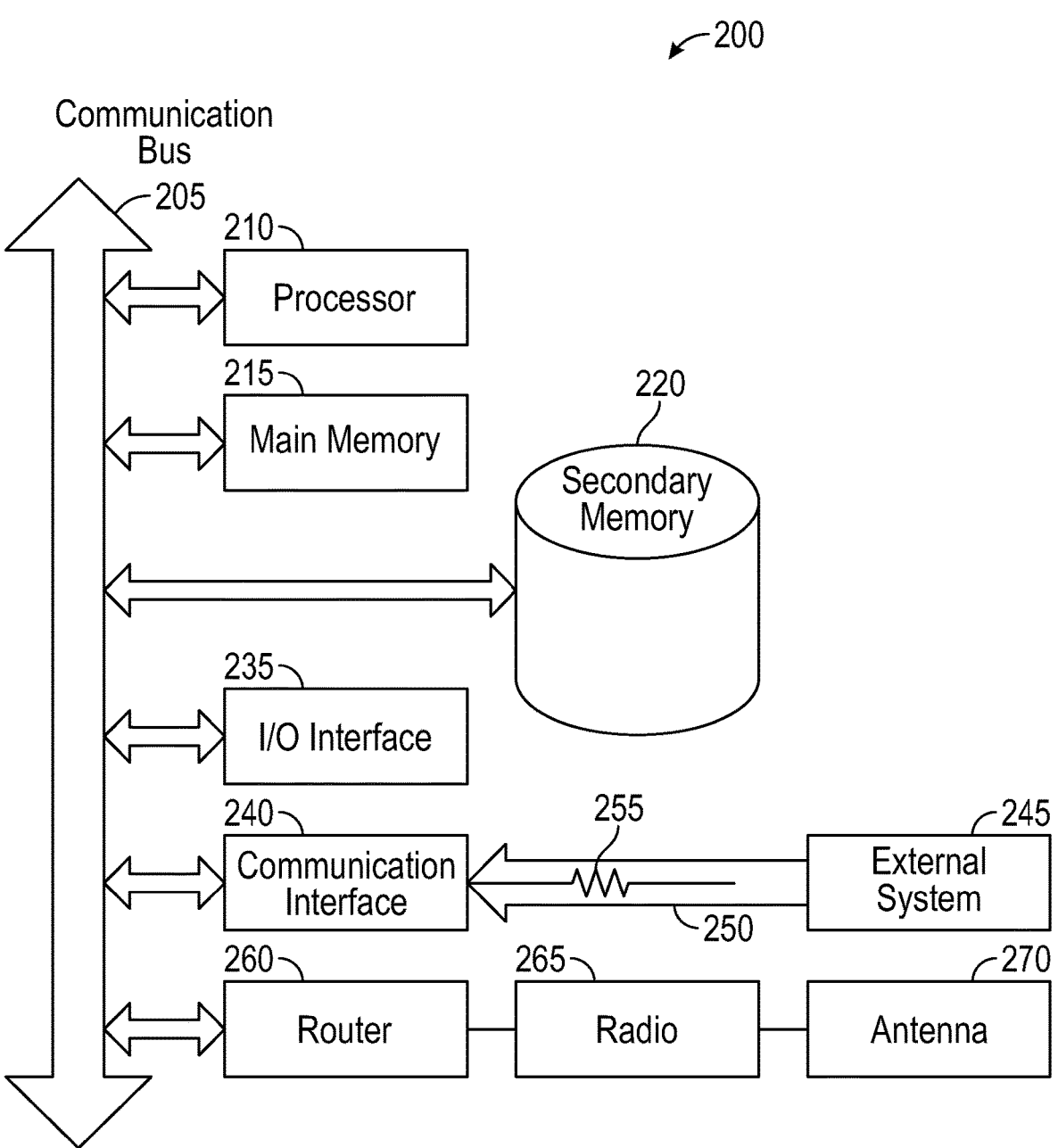
FIG. 2 illustrates an example processing system, by which one or more of the processes described herein, may be executed, according to an embodiment.

FIG. 2 illustrates an example processing system 200, by which one or more of the processes described herein, may be executed, according to an embodiment. System 200 may be a wired or wireless system that is used in connection with any of the various embodiments described herein. For example, system 200 may be used as or in conjunction with one or more of the functions, processes, or methods described herein (e.g., to store and/or execute the implementing software), and may represent components of work machine 110 (e.g., controller 120, communication module 125, camera(s) or other sensors, etc.), platform 150, remote terminal 160, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/ or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

In an embodiment, I/O interface 235 provides an interface between one or more components of system 200 and one or more input and/or output devices. Example input devices include, without limitation, sensors, keyboards, touch screens or other touch-sensitive devices, joysticks, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console, smart-phone, tablet computer, mobile device, etc.).

System 200 may include a communication interface 240. Communication interface 240 allows software and data to be transferred between system 200 and an external system 245. For example, computer software or executable code may be transferred to system 200 from a network server (e.g., platform 150) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network 140) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network 140), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

System 200 may also include wireless communication components that facilitate wireless communication over a voice network and/or a data network. The wireless communication components, which may correspond to communication module 125 in the event that system 200 implements controller 120, may comprise an antenna 270, a radio 265, and a router 260. In an embodiment, router 260 and radio 265 may be combined into a single component. In any case, router 260 is communicatively coupled with processor(s) 210. In the case that system 200 is controller 120, router 260 may separate the private local area network (LAN) of work machine 110 from public network 140. In system 200, radio frequency (RF) signals are transmitted and received over the air by antenna 270 under the management of radio 265.

Computer-executable code (e.g., computer programs, such as the disclosed software) is stored in main memory 215 and/or secondary memory 220. Computer-executable code can also be received via communication interface 240 and/or communication module 125 (e.g., comprising router 260, radio 265, and antenna 270) and stored in main memory 215 and/or secondary memory 220. Such computer programs, when executed, may enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220, external system 245, and any peripheral device communicatively coupled with communication interface 240 (including a network information server or other network device). These non-transitory computer-readable media are means for providing software and/or other data for utilization in system 200.

Figure 3:
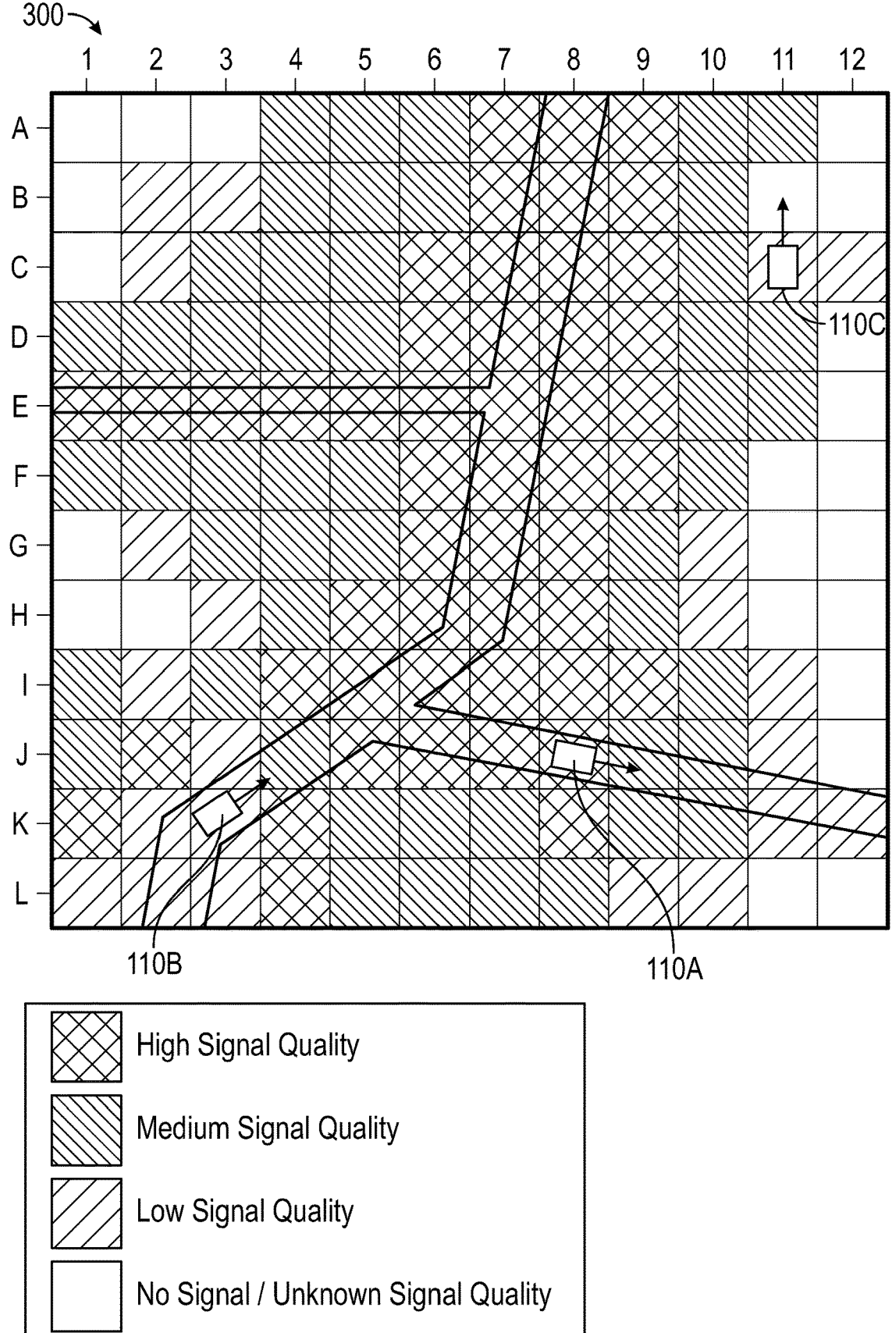
FIG. 3 illustrates a signal map representing geocached connectivity information, according to an embodiment.

FIG. 3 illustrates a signal map 300 representing geo-cached connectivity information, according to an embodiment. In a preferred embodiment, the controller 120 of each work machine 110 generates, stores, updates, and utilizes a distinct machine-specific signal map 300. In other words, each work machine 110 maintains its own signal map 300, for example, within a memory of controller 120 (e.g., main memory 215 and/or secondary memory 220). In an alternative embodiment, platform 150 may generate, store, and update a global signal map 300, based on data collected from a plurality of work machines 110. In this case, each work machine 110 may download or otherwise utilize the global signal map 300, such that all work machines 110 utilize the same global signal map 300. Alternatively, the global signal map 300 may be used a seed or starting point for signal maps 300 of work machines 110, which may subsequently evolve independently from each other to become machine-specific signal maps 300.

In order to facilitate the collection, storage, and retrieval of the connectivity information, signal map 300 may geographically discretize or quantize the work site of machine environment 100 into a plurality of bins. For ease of understanding, in the illustrated embodiment, these bins correspond to a grid. In this grid, region A1 corresponds to a first bin, region A2 corresponds to a second bin, and so on and so forth, all the way to region L12 which corresponds to a one-hundred-forty-fourth bin. It should be understood that the illustrated layout, the number, the sizes, and other attributes of the bins are merely examples. In practice, the bins may be laid out in any configuration (e.g., non-grid), may be in any number, may have any size (e.g., smaller or larger, including potentially different sizes for different bins), and/or the like. In general, the smaller that each bin is in size and the greater the number of bins, the higher the resolution of signal map 300.

It should be understood that each bin represents a geographical location within the work site of machine environment 100. Signal map 300 may define the plurality of geographical locations using geofences. A geofence is a virtual geographical boundary defined by GNSS (e.g., GPS coordinates), RF identification (RFID), or other similar technology. Each bin represents a geographical location, and each geographical location is defined by a geofence. Thus, the terms "bin," "geographical location," and "geofence" may be used interchangeably herein.

Signal map 300 may associate each geographical location with an indication of historical signal quality within the geographical location. The historical signal quality for a given geographical location may be represented as a single value or a plurality of values. In the case of a single value, the single value may be a numerical value representing the most recently detected signal quality along a continuum (e.g., zero to one, zero to one hundred, etc.), a numerical value representing an aggregation of a plurality of the most recently detected signal qualities along a continuum (e.g., a weighted average in which more recently detected signal qualities are weighted more than less recently detected signal qualities, a straight average, or some other aggregation), a numerical value representing an aggregation of signal qualities for a plurality of geographical locations representing a vicinity of (e.g., adjacent to) the geographical location (e.g., a weighted average in which the detected signal qualities for closer geographical locations in the vicinity of the geographical location and/or more recently detected signal qualities are weighted higher than more distant geographical locations and/or less recently detected signal qualities), an enumeration value representing a classification of the predicted signal quality into one of a plurality of finite classes, or the like. In the case of a plurality of values, the plurality of values may represent a set of numerical values representing the most recently detected signal qualities or all previously detected signal qualities along a continuum, a set of enumeration values representing the classifications of the most recently detected signal qualities or all previously detected signal qualities, or the like.

In an embodiment in which the indication of historical signal quality is represented in signal map 300 as a numerical value along a continuum, the numerical value may be the value of any parameter that is indicative of signal quality or the output of an algorithm that considers a plurality of such parameters. Examples of suitable parameters include, without limitation, signal-to-noise ratio (SNR), signal-to-interference-plus-noise ratio (SINR), received signal strength indicator (RSSI), reference signal received power (RSRP), reference signal received quality (RSRQ), a latency of wireless communications (e.g., calculated as a difference between a first timestamp representing the time at which the most recent command was sent by a remote terminal 160 and a second timestamp representing the time at which the most recent command was received at communication module 125 from remote terminal 160), a number of dropped packets, a packet timeout, a time spent operating in the respective geographical location (e.g., indicating the presence of a wireless connection), and/or any other measure or predictor of a wireless connection, a communications reliability, or other indicator of signal quality.

In an embodiment in which the indication of historical signal quality is represented in signal map 300 as an enumeration value, the value of any parameter (e.g., as discussed above) that is indicative of signal quality or the output of an algorithm that considers a plurality of such parameters may be quantized into one of a plurality of finite classes. In the illustrated embodiment, the parameter(s) are quantized into one of four classes, consisting of high signal quality, medium signal quality, low signal quality, or no signal/unknown signal quality. Each geographical location is associated with one of these classes. It should be understood that this is simply one example for purposes of illustration. In practice, there may be fewer or more classes. In any case, the classes may be defined as thresholds representing value range(s) of the parameters. In an alternative embodiment, the enumeration value may be a binary value, with a first enumeration value (e.g., one or true) representing that work machine 110 has previously operated in the geographical location (i.e., indicating that there is a wireless connection available in the geographical location) and a second enumeration value (e.g., zero or false) representing that work machine 110 has not previously operated in the geographical location (i.e., such that the availability of a wireless connection is unknown). Notably, this alternative embodiment is not reliant on measuring the value of any parameter, other than the location of work machine 110.

In any case, the indications of historical signal quality in signal map 300 be subject to a forgetting factor. In other words, as the time that a historical signal quality was detected recedes further into the past, the indication of that historical signal quality may be gradually forgotten. In this context, forgetting may mean deleting the indication of historical signal quality after it has aged a predefined amount, weighting the indication of historical signal quality less than more recent indications of historical signal quality when predicting a signal quality for a geographical location, and/or the like. In an embodiment in which weighting is used as the forgetting factor, the historical signal qualities indicated in signal map 300 may be forgotten as a linear function or exponential function (e.g., using a weighted moving average) of time.

For the purposes of providing specific examples, which will be used elsewhere herein, the locations of three work machines 110A, 110B, and 110C, are illustrated with respect to signal map 300. Work machine 110A is currently in geographical location J8, which has high signal quality, and approaching a new geographical location J9, which has medium signal quality. Work machine 110B is currently in geographical location K3, which has low signal quality, and approaching a new geographical location J4, which has medium signal quality. Work machine 110C is currently in geographical location C11, which has low signal quality, and approaching a new geographical location B11, which has no signal or unknown signal quality.

As used herein, the term "new" in the phrase "new geographical location" should be understood to be relative to the current geographical location of work machine 110. Thus, the new geographical location may be either a geographical location that work machine 110 has visited in the past but is not currently in, or a geographical location that work machine 110 has never visited. If work machine 110 has visited the new geographical location in the past, it will generally be able to predict the signal quality in the new geographical location (e.g., based on the historical signal quality previously measured by work machine 110 during its past visit or visits). If work machine 110 has never visited the new geographical location in the past, it may not be able to confidently predict the signal quality in the new geographical location. In this case, the new geographical location will have unknown signal quality, and work machine 110 should approach the new geographical location cautiously. Alternatively, the signal quality could be predicted for a geographical location that work machine 110 has never visited (e.g., using a seed signal map 300, using one or more adjacent geographical locations for which the signal quality is known, etc.). In an embodiment, work machine 110 could operate in an exploratory mode to explore geographical locations, which work machine 110 has not previously visited, and measure the signal quality in these geographical location, for example, in order to build signal map 300.

Figure 4:
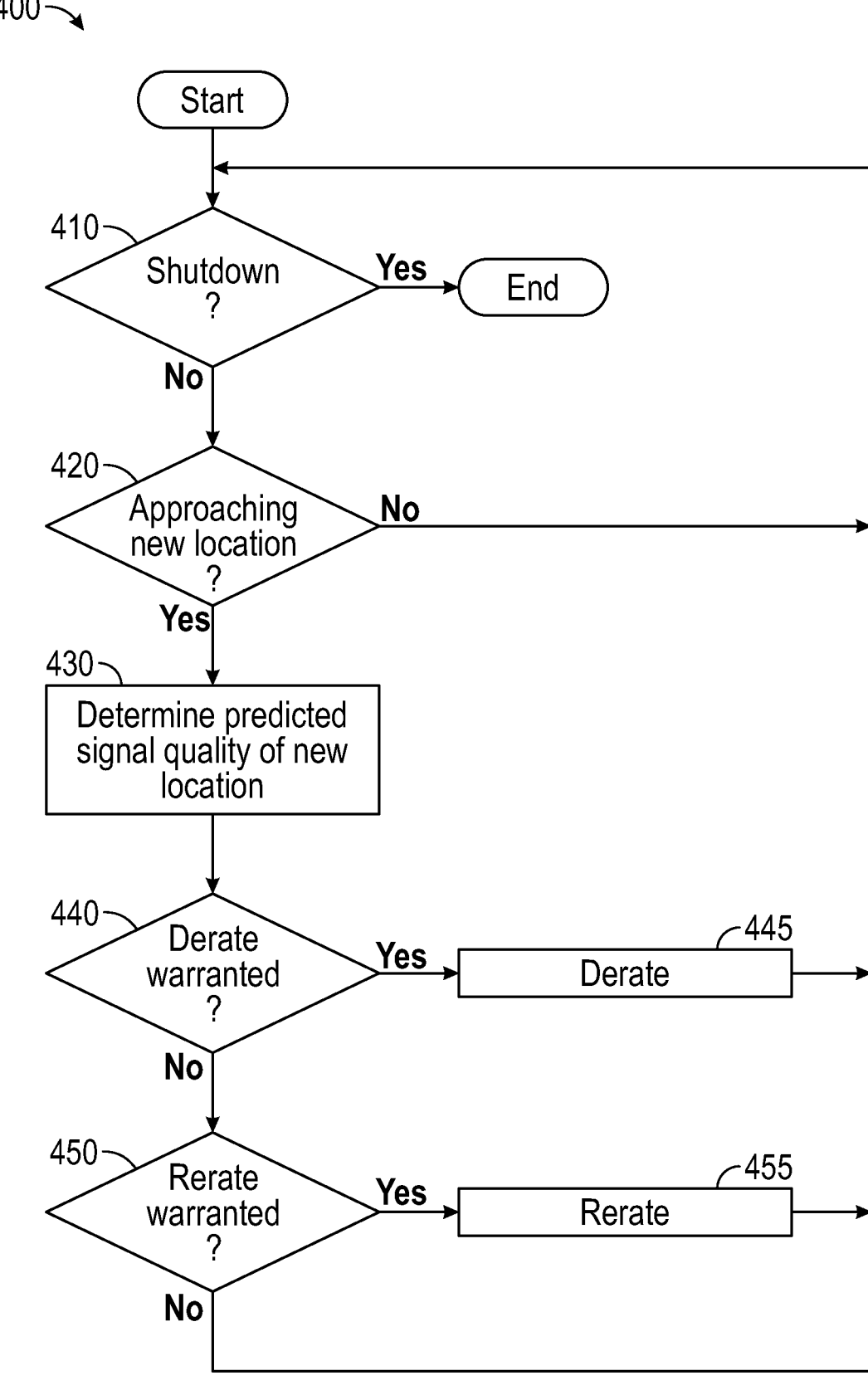
FIG. 4 illustrates a process for derating or rerating a work machine based on location, according to an embodiment.

FIG. 4 illustrates a process 400 for derating or rerating a work machine based on location, according to an embodiment. Process 400 may be implemented by controller 120, in software and/or hardware, within a work machine 110. In particular, process 400 may be performed by processor 210 of controller 120, router 260 (e.g., which may comprise its own programmable CPU) of controller 120, and/or partially by processor 210 and partially by router 260 of controller 120. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 410, it is determined whether or not work machine 110 is to be shutdown. When determining that work machine 110 is to be shutdown (i.e., "Yes" in subprocess 410), process 400 may end. Otherwise, when determining that work machine 110 is not to be shutdown (i.e., "No" in subprocess 410), process 400 proceeds to subprocess 420. In other words, process 400 may execute continuously for as long as work machine 110 is operational, and end, along with other functions of work machine 110, when work machine 110 is shutdown (i.e., operation of work machine 110 is terminated).

In subprocess 420, it is determined whether or not work machine 110 is approaching a new geographical location (i.e., any geographical location other than the geographical location in which work machine 110 is currently located as defined, for example, in signal map 300). Controller 120 may determine the current location of work machine 110 using a sensor, such as a GPS receiver or other GNSS receiver. A work machine 110 may be determined to be approaching a new geographical location when the current location is within a predefined distance from the geofence defining that new geographical location. Additionally or alternatively, a work machine 110 may be determined to be approaching a new geographical location when a trajectory (e.g., velocity, including speed and direction) of work machine 110 indicates that work machine 110 will enter the geofence defining that new geographical location within a predefined amount of time. The trajectory of work machine 110 may be determined based on the current location of work machine 110 and one or more recent past locations of work machine 110. Additionally or alternatively, one or more other criteria may be used to determine that work machine 110 is approaching a new geographical location. When determining that work machine 110 is approaching a new geographical location (i.e., "Yes" in subprocess 420), process 400 may proceed to subprocess 430. Otherwise, when not determining that work machine 110 is approaching a new geographical location (i.e., "No" in subprocess 420), process 400 may return to subprocess 410. In the illustrated example, it may be determined that work machine 110A is approaching a new geographical location J9, work machine 110B is approaching a new geographical location J4, and work machine 110C is approaching a new geographical location B11.

In subprocess 430, a predicted signal quality, associated with the new geographical location, may be determined based on (e.g., in response to) the determination that work machine 110 is approaching the new geographical location. In an embodiment, the predicted signal quality may be determined by aggregating the indications of historical signal quality of the new geographical location and one or more other geographical locations in the vicinity of (e.g., adjacent to) the new geographical location. In an alternative embodiment, the predicted signal quality may be determined by simply retrieving the indication of historical signal quality associated with the new geographical location in signal map 300. In this embodiment, the indication of historical signal quality, associated with the new geographical location in signal map 300, may already be an aggregation of signal qualities in the vicinity of the new geographical location. In other words, the aggregation may be performed either when retrieving the indication of historical signal quality for a given geographical location from signal map 300, or when saving the indication of historical signal quality for the given geographical location to signal map 300. Alternatively, the indication of signal quality may be a direct measure or other indication of signal quality within only the given geographical location (i.e., without consideration for signal qualities in other geographical locations in the vicinity). In any case, the indication(s) of historical signal quality may be retrieved from or otherwise based on signal map 300, which may be stored in memory (e.g., main memory 215 and/or secondary memory 220) of controller 120.

Using the vicinity for the indication of historical signal quality for a given geographical location can be beneficial since the location of work machine 110 will not necessarily align with the center of each geographical location. In such an embodiment, the uncertainty of the exact location of work machine 110 (e.g., resulting from measurement error, quantization error, and/or the like) may be taken into account by smoothing, filtering, accumulating, or otherwise aggregating the indications of historical signal quality for each of the plurality of geographical locations in the vicinity of the new geographical location, including the new geographical location itself. This aggregation may be performed in any suitable manner, such as, for example, by taking an average of the indications of historical signal qualities in the vicinity (e.g., a straight average, a weighted average in which the indications of historical signal qualities are weighted based on distance from the new geographical location or current location of work machine 110, how recent the historical signal quality was detected, and/or the like, etc.).

In the illustrated example, as work machine 110B approaches new geographical location J4, the predicted signal quality, associated with geographical location J4, may be determined as the indication of the historical signal quality (i.e., medium signal quality) associated with geographical location J4 in signal map 300. Alternatively, the predicted signal quality, associated with geographical location J4, may be determined as an aggregation of the indications of historical signal quality associated with the vicinity of geographical location J4. The vicinity of geographical location J4 may include geographical location J4 and one or more, including potentially all, of the adjacent geographical locations. For example, the vicinity of geographical location J4 may comprise or consist of geographical locations 13, 14, 15, J3, J4, J5, K3, K4, and/or K5. As one example of the aggregation, the predicted signal quality may be determined as an average of the indications of historical signal quality for the vicinity. In this case, assigning a value of zero to no signal or unknown signal quality, a value of one to low signal quality, a value of two to medium signal quality, and a value of three to high signal quality, the predicted signal quality, determined in subprocess 430, could be calculated as $(2+3+3+1+2+3+1+3+2)/9=2.22$, which may be classified (e.g., based on rounding to the nearest integer) as medium signal quality. It should be understood that the aggregation of other types of indications (e.g., numerical or enumeration values) of historical signal quality may be performed in a similar manner.

In subprocess 440, it is determined whether or not derating work machine 110 is warranted. In particular, it may be determined whether or not the predicted signal quality, determined in subprocess 430, satisfies one or more derating criteria. In an embodiment in which there are a plurality of derating criteria, the derating criteria may be satisfied when at least one of the derating criteria is satisfied or when all of the derating criteria are satisfied, depending on the particular implementation.

The derating criteria may comprise or consist of the predicted signal quality, determined in subprocess 430, satisfying (e.g., being less than) a predefined threshold. For instance, a derating criterion may be satisfied when the value of the predicted signal quality falls below a predefined threshold. In an embodiment, the derating criteria may be tiered, such that, for example, a first derating criterion is satisfied when the predicted signal quality falls below a first threshold, and a second derating criterion is satisfied when the predicted signal quality falls below a second threshold that is less than the first threshold. It should be understood that there may be any number of derating criteria with respective thresholds, such that any number of tiers may be formed. In an embodiment in which the predicted signal quality is quantized into one of a plurality of classes, the derating criteria may be implemented such that derating is determined to be warranted in subprocess 440 whenever the predicted signal quality drops from a first class indicative of higher signal quality to a second class indicative of lower signal quality (e.g., from high signal quality to medium signal quality, low signal quality, or no signal or unknown signal quality, from medium signal quality to low signal quality, or no signal or unknown signal quality, or from low signal quality to no signal or unknown signal quality).

In the illustrated example, as work machine 110A approaches new geographical location J9, it may be determined that geographical location J9 has a sufficiently low predicted signal quality, or lower predicted signal quality than the historical or actual signal quality in current geographical location J8, that a derating criterion is satisfied. Similarly, as work machine 110C approaches new geographical location B11, it may be determined that geographical location B11 has no signal or an unknown signal quality, such that a derating criterion is satisfied. Conversely, as work machine 110B approaches new geographical location J4, it may be determined that the predicted signal quality of geographical location J4 is the same as or higher than the current signal quality in geographical location K3, such that no derating criteria are satisfied.

In subprocess 445, work machine 110 may be derated, based on (e.g., in response to) determining that the predicted signal quality, determined in subprocess 430, satisfies at least one derating criterion. In particular, at least one operational parameter of work machine 110 may be derated. In an embodiment, there are a plurality of levels of derating, and one of the plurality of levels may be selected for the derating in subprocess 445 based on the predicted signal quality that was determined in subprocess 430. For example, a lower predicted signal quality may be associated with a higher level of derating. In other words, the relationship between the level of derating and predicted signal quality may be monotonic, such that, as the predicted signal quality decreases, the level of derating remains the same or increases. Each level of derating may be associated with a respective tier of the derating criteria, such the when one tier of the derating criteria is satisfied in subprocess 440, the associated level of derating is applied in subprocess 445. After subprocess 445, process 400 may return to subprocess 410.

As used herein, the term "derate" or "derating" is used to refer to any restriction, constraint, or other limitation on one or more operational parameters of work machine 110. In other words, the value of the operational parameter(s) of work machine 110 are limited to less than the full range of values of which work machine 110 is capable. Each level of derating may be represented as a percentage of the full range of values (e.g., maximum value) of which work machine 110 is capable. As one example, the level of derating may be 0% when the predicted signal quality indicates a 100% likelihood of a successful wireless connection (e.g., satisfying a first tier of the derating criteria), 25% when the predicted signal quality indicates a 50-75% likelihood of a successful wireless connection (e.g., satisfying a second tier of the derating criteria), 50% when the predicted signal quality indicates a 25-50% likelihood of a successful wireless connection (e.g., satisfying a third tier of the derating criteria), and 75% when the predicted signal quality indicates a 0-25% likelihood of a successful wireless connection (e.g., satisfying a fourth tier of the derating criteria).

In an embodiment, the derating of at least one operational parameter may limit movement of work machine 110 (e.g., movement of ground-engaging members 114, work implement 116, or other component of work machine 110) without stopping the movement of work machine 110. Examples of derating at least one operational parameter include, without limitation, decreasing the maximum speed or propulsion of work machine 110, decreasing the maximum available gear of the transmission of work machine 110, decreasing the maximum state of the throttle on the engine of work machine 110, decreasing a maximum engine speed of work machine 110, decreasing a maximum rim-pull of work machine 110, decreasing a maximum hydraulic flow within work implement 116 or other component of work machine 110, decreasing a rate of change in hydraulic pressure within work implement 116 or other component of work machine 110, decreasing a velocity of work implement 116 or other component of work machine 110, applying a braking system or other machine-retarding system of work machine 110 (e.g., to ground-engaging members 114, work implement 116, or other component of work machine 110), and/or the like.

In subprocess 450, it is determined whether or not rerating work machine 110 is warranted. In particular, it may be determined whether or not the predicted signal quality, determined in subprocess 430, satisfies one or more rerating criteria. In an embodiment in which there are a plurality of rerating criteria, the rerating criteria may be satisfied when at least one of the rerating criteria is satisfied or when all of the rerating criteria are satisfied, depending on the particular implementation.

The rerating criteria may comprise or consist of the predicted signal quality, determined in subprocess 430, satisfying (e.g., being greater than or equal to) a predefined threshold. For instance, a rerating criterion may be satisfied when the value of the predicted signal quality equals or exceeds a predefined threshold. In an embodiment, the rerating criteria may be tiered, such that, for example, a first rerating criterion is satisfied when the predicted signal quality equals or exceeds a first threshold, and a second rerating criterion is satisfied when the predicted signal quality equals or exceeds a second threshold that is greater than the first threshold. It should be understood that there may be any number of rerating criteria with respective thresholds, such that any number of tiers may be formed. In an embodiment in which the predicted signal quality is quantized into one of a plurality of classes, the rerating criteria may be implemented such that rerating is determined to be warranted in subprocess 450 whenever the predicted signal quality increases from a first class indicative of lower signal quality to a second class indicative of higher signal quality (e.g., from no signal or unknown signal quality to low signal quality, medium signal quality, or high signal quality, from low signal quality to medium signal quality or high signal quality, or from medium signal quality to high signal quality).

In the illustrated example, as work machine 110B approaches new geographical location J4, it may be determined that geographical location J4 has a sufficiently high predicted signal quality, or higher predicted signal quality than the historical or actual signal quality in current geographical location K3, that a rerating criterion is satisfied. Conversely, as work machine 110A approaches new geographical location J9, it may be determined that the predicted signal quality of geographical location J9 is the same as or lower than the current signal quality in geographical location J8, such that no rerating criteria are satisfied. Similarly, as work machine 110C approaches new geographical location B11, it may be determined that the predicted signal quality of geographical location B11 is the same as or lower than the current signal quality in geographical location C11, such that no rerating criteria are satisfied.

In subprocess 455, work machine 110 may be rerated, based on (e.g., in response to) determining that the predicted signal quality, determined in subprocess 430, satisfies at least one rerating criterion. In particular, at least one operational parameter of work machine 110 may be rerated. In an embodiment, there are a plurality of levels of rerating, and one of the plurality of levels may be selected for the rerating in subprocess 455 based on the predicted signal quality that was determined in subprocess 430. For example, a higher predicted signal quality may be associated with a higher level of rerating. In other words, the relationship between the level of rerating and predicted signal quality may be monotonic, such that, as the predicted signal quality increases, the level of rerating remains the same or increases. Each level of rerating may be associated with a respective tier of the rerating criteria, such the when one tier of the rerating criteria is satisfied in subprocess 450, the associated level of rerating is applied in subprocess 455. After subprocess 455, process 400 may return to subprocess 410.

As used herein, the term "rerate" or "rerating" is used to refer to the elimination or other reduction in a restriction, constraint, or other limitation that has been imposed on one or more operational parameters of work machine 110. In other words, the value of the operational parameter(s) of work machine 110 may take on a fuller range of values, and potentially the full range of values, of which work machine 110 is capable. Each level of rerating may be represented as a percentage of the full range of values (e.g., maximum value) of which work machine 110 is capable. As one example, the level of rerating may be 100% when the predicted signal quality indicates a 100% likelihood of a successful wireless connection (e.g., satisfying a first tier of the rerating criteria), 75% when the predicted signal quality indicates a 50-75% likelihood of a successful wireless connection (e.g., satisfying a second tier of the rerating criteria), 50% when the predicted signal quality indicates a 25-50% likelihood of a successful wireless connection (e.g., satisfying a third tier of the rerating criteria), and 25% when the predicted signal quality indicates a 0-25% likelihood of a successful wireless connection (e.g., satisfying a fourth tier of the rerating criteria).

Examples of rerating at least one operational parameter include, without limitation, increasing the maximum speed or propulsion of work machine 110, increasing the maximum available gear of the transmission of work machine 110, increasing the maximum state of the throttle on the engine of work machine 110, increasing a maximum engine speed of work machine 110, increasing a maximum rim-pull of work machine 110, increasing a maximum hydraulic flow within work implement 116 or other component of work machine 110, increasing a rate of change in hydraulic pressure within work implement 116 or other component of work machine 110, increasing a velocity of work implement

116 or other component of work machine 110, reducing application of a braking system or other machine-retarding system of work machine 110 (e.g., to ground-engaging members 114, work implement 116, or other component of work machine 110), and/or the like.

Figure 5:
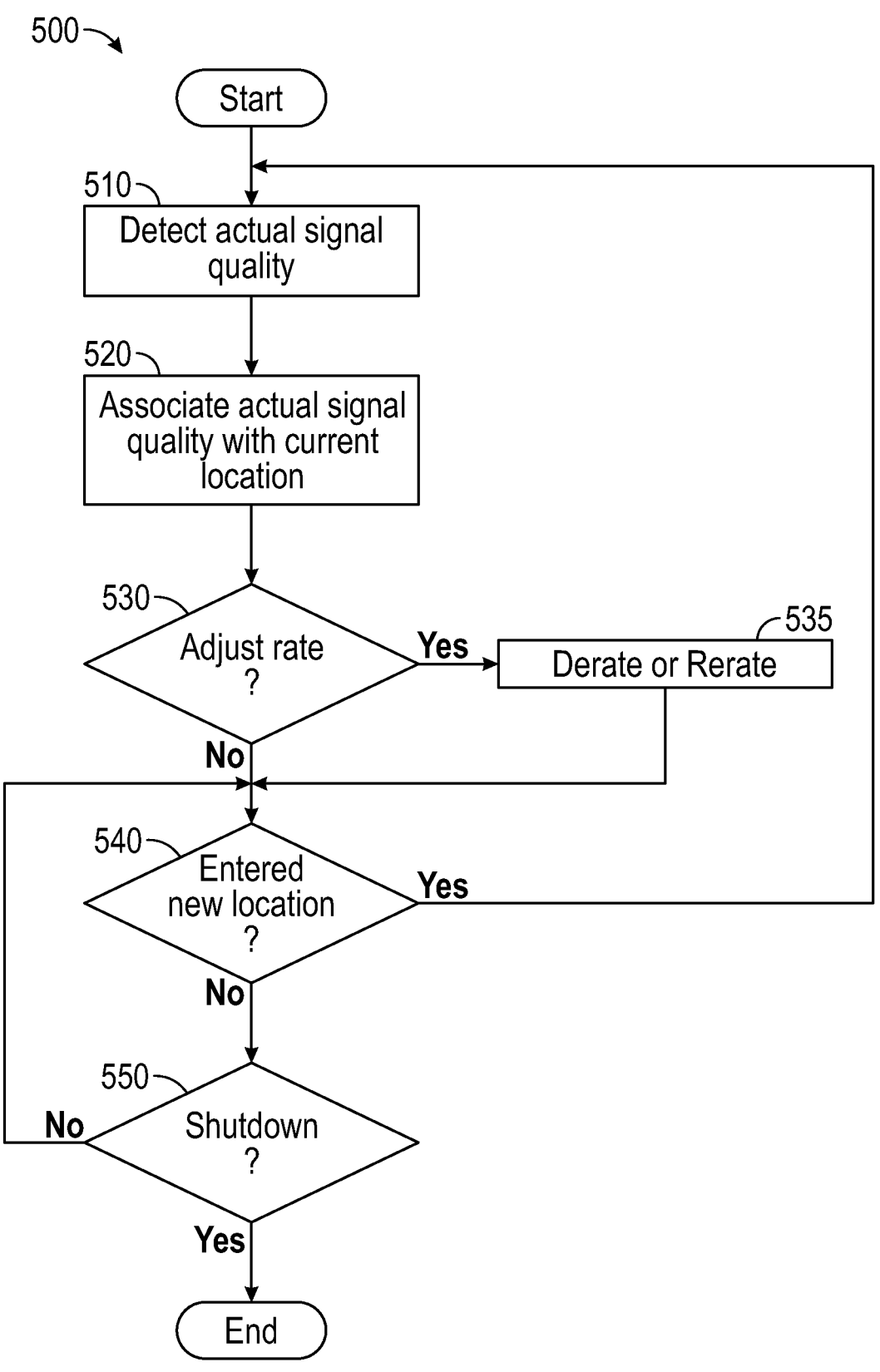
FIG. 5 illustrates a process for acquiring geocached connectivity information during operation of a work machine, according to an embodiment.

FIG. 5 illustrates a process 500 for acquiring geocached connectivity information during operation of a work machine 110, according to an embodiment. Process 500 may be implemented by controller 120, in software and/or hardware, within a work machine 110. In particular, process 500 may be performed by processor 210 of controller 120, router 260 (e.g., which may comprise its own programmable CPU) of controller 120, and/or partially by processor 210 and partially by router 260 of controller 120. While process 500 is illustrated with a certain arrangement and ordering of subprocesses, process 500 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 510, the actual signal quality of the wireless connection, between work machine 110 and an access point 130 of network 140A in the current geographical location of work machine 110, is detected. In particular, the current and actual signal quality at antenna 270 of communication module 125 of controller 120 may be calculated or otherwise detected. It should be understood that the actual signal quality may be represented in the same manner as the predicted signal quality (e.g., as represented in signal map 300). For example, the actual signal quality may be a numerical value of a parameter that is indicative of signal quality, such as SNR, SINR, RSSI, RSRP, RSRQ, latency of wireless communications (e.g., calculated based on a time associated with a most recent command received from a remote operator, such as the time between a first timestamp representing when the most recent command was sent by remote terminal 160 and a second timestamp representing when the most recent command was received by work machine 110), number of dropped packets, packet timeout, a time spent operating in the current geographical location (e.g., indicating the presence of a wireless connection), or the like, or the output of an algorithm that considers a plurality of such parameters. Alternatively, the actual signal quality may be an enumeration value that quantizes one or more of such parameters into one of a plurality of finite classes (e.g., high signal quality, medium signal quality, low signal quality, or no signal or unknown signal quality), or is one of a binary value representing that work machine 110 currently has a wireless connection such that it is able to operate in the current geographical location.

In subprocess 520, the actual signal quality, detected in subprocess 510, is associated with the current geographical location of work machine 110. In an embodiment that utilizes signal map 300, subprocess 520 may comprise modifying signal map 300 based on the actual signal quality. This modification of signal map 300 may comprise saving an indication of the actual signal quality that was detected in subprocess 510 into signal map 300. In the case that signal map 300 only associates one indication of historical signal quality with each geographical location, subprocess 520 may comprise overwriting the prior indication of historical signal quality that was associated with the current geographical location with the indication of actual signal quality. In the case that signal map 300 associates a plurality of indications of historical signal quality with each geographical location, subprocess 520 may comprise adding the indication of actual signal quality to the indications of historical signal quality associated with the current geographical location (e.g., potentially overwriting an oldest one of the indications of historical signal quality that was associated with the current geographical location). It should be understood that the indication of actual signal quality may be the value of actual signal quality that was detected in subprocess 520, or may be an aggregation of the actual signal quality that was detected in subprocess 520 with other historical signal qualities associated (e.g., in signal map 300) with the current geographical location and/or other geographical locations in the vicinity of the current geographical location.

In subprocess 530, it is determined whether or not to adjust the current rate of work machine 110 based on the actual signal quality that was detected in subprocess 510. In particular, the same derating criteria that were used in subprocess 440 may be used to determine whether or not to adjust the rate by derating at least one operational parameter of work machine 110, and the same rerating criteria that were used in subprocess 450 may be used to determine whether or not to adjust the rate by rerating at least one operational parameter of work machine 110. In other words, subprocess 530 may be identical to the combination of subprocesses 440 and 450, except that the derating and rerating criteria are applied to the actual signal quality, as opposed to the predicted signal quality. When determining to adjust the rate of work machine 110 (i.e., "Yes" in subprocess 530), process 500 may proceed to subprocess 535. Otherwise, when determining not to adjust the rate of work machine 110 (i.e., "No" in subprocess 530), process 500 may proceed to subprocess 540 without adjusting the rate of work machine 110.

In subprocess 535, the rate of work machine 110 is derated or rerated, based on (e.g., in response to) determining to adjust the rate of work machine 110, in subprocess 530, based on the actual signal quality detected in subprocess 510. In particular, at least one operational parameter of work machine 110 may be derated or rerated based on the actual signal quality that was detected in subprocess 510. The derating in subprocess 535 may be identical or similar to the derating in subprocess 445, except that the derating (e.g., level of derating) is determined based on the actual signal quality, as opposed to the predicted signal quality. Similarly, the rerating in subprocess 535 may be identical or similar to the rerating in subprocess 455, except that the rerating (e.g., level of rerating) is determined based on the actual signal quality, as opposed to the predicted signal quality.

In subprocess 540, it determined whether or not work machine 110 has entered a new geographical location. In particular, the current location of work machine 110 may be determined by one or more sensors. For example, the GPS coordinates of work machine 110 may be determined by a GPS receiver. Then, the current location of work machine 110 may be compared to one or more geofences (e.g., in signal map 300) to determine whether work machine 110 remains in a geofence defining a geographical region for which subprocesses 510-535 were just performed, or has crossed into a new geofence defining a new geographical region for which subprocesses 510-535 have not been performed since being in at least one other geographical location. When determining that work machine 110 has entered a new geographical location (i.e., "Yes" in subprocess 540), process 500 may return to subprocess 510. Otherwise, when determining that work machine 110 has not entered a new geographical location (i.e., "No" in subprocess 540), process 500 may proceed to subprocess 550.

In subprocess 550, it is determined whether or not work machine 110 is to be shutdown. When determining that work machine 110 is to be shutdown (i.e., "Yes" in subprocess 550), process 500 may end. Otherwise, when determining that work machine 110 is not to be shutdown (i.e., "No" in subprocess 550), process 500 may return to subprocess 540. In other words, process 500 may execute continuously for as long as work machine 110 is operational, and end, along with other functions of work machine 110, when work machine 110 is shutdown (i.e., operation of work machine 110 is terminated). In an embodiment, subprocess 550 may be identical to subprocess 410 in process 400.

It should be understood that processes 400 and 500 may be performed simultaneously in parallel by controller 120 of a work machine 110. For instance, in process 400, the rate (e.g., of at least one operational parameter) of work machine 110 may be derated or rerated, based on the predicted signal quality, as work machine 110 approaches a new geographical location. Then, in process 500, once work machine 110 has actually entered the new geographical location, the rate (e.g., of at least one operational parameter) of work machine 110 may be adjusted based on the actual signal quality that is detected in the new geographical location.

In the illustrated example, work machine 110A, which is currently in geographical location J8, may be derated (e.g., in subprocess 445) as it approaches new geographical location J9 (e.g., as determined in subprocess 420) based on a predicted signal quality for geographical location J9 (e.g., as determined in subprocess 430) that warrants derating (e.g., as determined in subprocess 440). However, once work machine 110A exits geographical location J8 and enters new geographical location J9 (e.g., as determined in subprocess 540), it may turn out that the actual signal quality (e.g., as detected in subprocess 510) is significantly better than the predicted signal quality. In this case, signal map 300 may be updated (e.g., in subprocess 520), and work machine 110A may be rerated (e.g., in subprocess 535, based on a determination using one or more rerating criteria in subprocess 530). Alternatively, it may turn out that the actual signal quality (e.g., as detected in subprocess 510) is significantly worse than the predicted signal quality, in which case signal map 300 may be updated (e.g., in subprocess 520), and work machine 110A may be derated (e.g., in subprocess 535, based on a determination using one or more derating criteria in subprocess 530). As another alternative scenario, it may turn out that the actual signal quality (e.g., as detected in subprocess 510) is the same as or similar to the predicted signal quality, in which case signal map 300 may or may not be updated (e.g., in subprocess 520), and the rate of work machine 110A may not be adjusted (e.g., "No" in subprocess 530).

In the illustrated example, work machine 110B, which is currently in geographical location K3, may be rerated (e.g., in subprocess 455) as it approaches new geographical location J4 (e.g., as determined in subprocess 420) based on a predicted signal quality for geographical location J4 (e.g., as determined in subprocess 430) that warrants rerating (e.g., as determined in subprocess 450). However, once work machine 110B exits geographical location K3 and enters new geographical location J4 (e.g., as determined in subprocess 540), it may turn out that the actual signal quality (e.g., as detected in subprocess 510) is significantly worse than the predicted signal quality. In this case, signal map 300 may be updated (e.g., in subprocess 520), and work machine

110B may be derated (e.g., in subprocess 535, based on a determination using one or more derating criteria in subprocess 530). Alternatively, it may turn out that the actual signal quality (e.g., as detected in subprocess 510) is significantly better than the predicted signal quality, in which case signal map 300 may be updated (e.g., in subprocess 520), and work machine 110B may be rerated (e.g., in subprocess 535, based on a determination using one or more rerating criteria in subprocess 530). As another alternative scenario, it may turn out that the actual signal quality (e.g., as detected in subprocess 510) is the same as or similar to the predicted signal quality, in which case signal map 300 may or may not be updated (e.g., in subprocess 520), and the rate of work machine 110B may not be adjusted (e.g., "No" in subprocess 530).

In an embodiment, when a work machine 110 is approaching a geographical location that either is known to have no signal or for which the signal strength is unknown, in addition to derating work machine 110 (e.g., to the highest level of derating), an alert may be provided to platform 150 and/or to remote terminal 160. In the case of remote terminal 160, the alert may be provided to the remote operator of remote terminal 160 as a visual warning on display 162 (e.g., with the reason for the alert), a haptic warning on at least one input device 164, the remote operator's seat, and/or any other component of remote terminal 160, an audio warning through a speaker of remote terminal 160, and/or any other type of feedback. In the case of autonomous control, the alert may trigger an action (e.g., autonomous or semi-autonomous control to stop or turn work machine 110), by controller 120 or platform 150, to prevent work machine 110 from entering the geographical location or reduce the likelihood that work machine 110 will enter the geographical location.

In the illustrated example, work machine 110C, which is currently in geographical location C11, is approaching a new geographical location B11, for which no signal is present or the signal quality is unknown. Accordingly, as work machine 110C approaches geographical location B11, work machine 110C may be derated (e.g., in subprocess 445) to the highest one of the plurality of levels of derating. For instance, the maximum speed of work machine 110C may be decreased to a very low maximum speed (e.g., 5 miles per hour). It should be understood that, if the speed of work machine 110C is currently greater than this new maximum speed, the speed of work machine 110C will be reduced to equal to or less than this low maximum speed. Thus, if work machine 110C continues along the trajectory, such that work machine 110C enters geographical location B11 (e.g., as determined in subprocess 540), it will be traveling at or below this low maximum speed. Because work machine 110C is limited to this low maximum speed, if communication module 125 of work machine 110C loses the wireless connection to access point 130 in geographical location B11 and controller 120 of work machine 110C responsively terminates operation of work machine 110C, inertia will not carry work machine 110C very far before work machine 110C comes to a stop. Alternatively, it may turn out that work machine 110C does not lose the wireless connection, because the actual signal quality (e.g., as detected in subprocess 510) is better than the predicted signal quality (e.g., no signal or unknown signal quality, as determined in subprocess 430). In this case, signal map 300 may be updated (e.g., in subprocess 520), and work machine 110C may be rerated (e.g., in subprocess 535, based on a determination using one or more rerating criteria in subprocess 530).

INDUSTRIAL APPLICABILITY

The operation of a remotely controlled work machine 110 requires wireless communications over a wireless connection between communication module 125 and an access point 130 of network 140A. Without the wireless connection between communication module and access point 130, work machine 110 is unable to send data to platform 150 and remote terminal 160, and is unable to receive control commands from platform 150 and remote terminal 160. Thus, for safety purposes, if work machine 110 loses the wireless connection during operation, controller 120 may immediately terminate operation of work machine 110. However, if work machine 110 and/or work implement 116 are in motion when work machine 110 loses the wireless connection and operation of work machine 110 is terminated, work machine 110 and/or work implement 116 may continue in motion for some time due to inertia. This presents a safety hazard. Accordingly, disclosed embodiments predict the loss of a wireless connection in advance, and proactively prepare work machine 110 for the potential loss of the wireless connection by derating work machine 110 prior to and in anticipation of losing the wireless connection. This enhances safety by reducing the time that work machine 110 and/or work implement 116 continue moving, due to inertia, after the termination of operations.

In particular, according to process 400, as work machine 110 approaches a new geographical location, controller 120 of work machine 110 predicts a signal quality between communication module 125 and access point 130 within the new geographical location. One or more derating criteria are applied to this predicted signal quality to determine whether or not derating is warranted. For example, if the predicted signal quality indicates an increase in the likelihood of a lost wireless connection after entering the new geographical location, work machine 110 may be derated by slowing or otherwise limiting work machine 110, for example, by decreasing an operational parameter of work machine 110 to less than the full range of the operational parameter. Conversely, if the predicted signal quality indicates a decrease in the likelihood of a lost wireless connection after entering the new geographical location, work machine 110 may be rerated by removing one or more limitations, imposed by a prior derating, on work machine 110, for example, by increasing an operational parameter of work machine 110 to or towards the full range of the operational parameter.

In addition, according to process 500, upon entering the new geographical location, controller 120 of work machine 110 detects the actual signal quality between communication module 125 and access point 130 within the new geographical location. One or more derating and/or rerating criteria are applied to the actual signal quality to determine whether to adjust the rate of work machine 110. For instance, if the actual signal quality is significantly better than the predicted signal quality, work machine 110 may be rerated, for example, by reversing the derating that was applied when approaching the new geographical location. Conversely, if the actual signal quality is significantly worse than the predicted signal quality, work machine 110 may be further derated, for example, by increasing the level of derating that was applied when approaching the new geographical location. If the actual signal quality is identical or similar to the predicted signal quality, the current rating of work machine 110 may be maintained.

Over iterations of process 500, and particularly subprocess 520, controller 120 of each work machine 110 may build a signal map 300, which may be stored in controller 120 and used by process 400, and particularly by subprocess 430, to determine the predicted signal quality associated with each geographical location that work machine 110 approaches (e.g., potentially accounting for the vicinity of the geographical location). Notably, signal map 300 will evolve over time as work machine 110 traverses and explores the work site of machine environment 100, to reflect the specific landscape of the work site, even as this landscape changes over time (e.g., during a mining, construction, forestry, farming, or other operation).

These signal maps 300 may be developed by each work machine 110 from scratch or starting from a seed signal map 300 (e.g., downloaded by all work machines 110 from platform 150). In either case, each work machine 110 may develop its respective signal map 300, independently from other work machines 110. Thus, for example, the signal map 300 maintained by work machine 110A may evolve independently and differently from the signal maps 300 maintained by work machines 110B and 110C. This enables each signal map 300 to reflect the specific characteristics of the respective work machine 110, which may differ from other work machines 110 in terms of the type of antenna 270, the power and/or range of antenna 270, the mounting location, height, and/or orientation of antenna 270, and/or any other characteristic that may affect signal quality.

To reduce complexity in processes 400 and 500, signal map 300 may discretize or quantize the work site of machine environment 100 into a plurality of bins, representing geographical locations, and defined by geofences. Each of these binned geographical locations may be associated with connectivity information, which is referred to herein as a signal quality. This connectivity information may be referred to as "geocached," because each item of connectivity information is associated with a geofence that defines a geographical location.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a particular type of work machine, it will be appreciated that it can be implemented in any mobile machine that relies on a wireless signal for operation, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method comprising, by a controller in a work machine:

maintaining a signal map within a memory of the controller;

determining that the work machine is approaching a new geographical location;

based on determining that the work machine is approaching the new geographical location, determining a predicted signal quality associated with the new geographical location by determining a signal quality in a vicinity of the new geographical location based on the signal map;

determining whether the predicted signal quality satisfies one or more derating criteria;

based on determining that the predicted signal quality satisfies at least one of the one or more derating criteria, derating at least one operational parameter of the work machine;

determining that the work machine has entered the new geographical location;

detecting an actual signal quality within the new geographical location;

determining to adjust a rate of the work machine based on the actual signal quality;

based on determining to adjust the rate of the work machine based on the actual signal quality, derating or rerating the at least one operational parameter of the work machine; and associating the actual signal quality with the new geographical location by modifying the signal map based on the actual signal quality.

2. The method of claim 1, wherein the signal map defines a plurality of geographical locations using geofences.

3. The method of claim 1, wherein determining the signal quality in the vicinity of the new geographical location comprises weighting more recently detected historical signal qualities in the signal map greater than less recently detected historical signal qualities in the signal map.

4. The method of claim 1, wherein detecting the actual signal quality comprises calculating the actual signal quality based on a time associated with a most recent command received from a remote operator.

5. The method of claim 1, wherein the new geographical location is a first new geographical location and the predicted signal quality is a first predicted signal quality, and wherein the method further comprises, by the controller:

determining that the work machine is approaching a second new geographical location;

based on determining that the work machine is approaching the second new geographical location, determining a second predicted signal quality associated with the second new geographical location;

determining whether the second predicted signal quality satisfies one or more rerating criteria; and based on determining that the second predicted signal quality satisfies at least one of the one or more rerating criteria, rerating the at least one operational parameter of the work machine.

6. The method of claim 1, wherein derating the at least one operational parameter limits movement of the work machine without stopping movement of the work machine.

7. The method of claim 1, wherein derating the at least one operational parameter comprises decreasing a maximum speed or propulsion of the work machine.

8. The method of claim 1, wherein derating the at least one operational parameter comprises decreasing a maximum state of a throttle on an engine of the work machine.

9. The method of claim 1, wherein derating the at least one operational parameter comprises decreasing a maximum engine speed of the work machine.

10. The method of claim 1, wherein derating the at least one operational parameter comprises applying a braking system of the work machine.

11. A method comprising, by a controller in a work machine:

determining that the work machine is approaching a new geographical location;

based on determining that the work machine is approaching the new geographical location, determining a predicted signal quality associated with the new geographical location;

determining whether the predicted signal quality satisfies one or more derating criteria; and based on determining that the predicted signal quality satisfies at least one of the one or more derating criteria, derating at least one operational parameter of the work machine, wherein derating the at least one operational parameter comprises decreasing a maximum available gear of a transmission of the work machine.

12. A method comprising, by a controller in a work machine:

determining that the work machine is approaching a new geographical location;

based on determining that the work machine is approaching the new geographical location, determining a predicted signal quality associated with the new geographical location;

determining whether the predicted signal quality satisfies one or more derating criteria; and based on determining that the predicted signal quality satisfies at least one of the one or more derating criteria, derating at least one operational parameter of the work machine, wherein derating the at least one operational parameter comprises decreasing a maximum rim-pull of the work machine.

13. A method comprising, by a controller in a work machine:

determining that the work machine is approaching a new geographical location;

based on determining that the work machine is approaching the new geographical location, determining a predicted signal quality associated with the new geographical location;

determining whether the predicted signal quality satisfies one or more derating criteria; and based on determining that the predicted signal quality satisfies at least one of the one or more derating criteria, derating at least one operational parameter of the work machine, wherein derating the at least one operational parameter comprises decreasing a maximum hydraulic flow within a work implement of the work machine.

14. A method comprising, by a controller in a work machine:

determining that the work machine is approaching a new geographical location;

based on determining that the work machine is approaching the new geographical location, determining a predicted signal quality associated with the new geographical location;

determining whether the predicted signal quality satisfies one or more derating criteria; and based on determining that the predicted signal quality satisfies at least one of the one or more derating criteria, derating at least one operational parameter of the work machine, wherein derating the at least one operational parameter comprises decreasing a maximum hydraulic pressure within a work implement of the work machine.

15. A method comprising, by a controller in a work machine:

determining that the work machine is approaching a new geographical location;

based on determining that the work machine is approaching the new geographical location, determining a predicted signal quality associated with the new geographical location;

determining whether the predicted signal quality satisfies one or more derating criteria; and based on determining that the predicted signal quality satisfies at least one of the one or more derating criteria, derating at least one operational parameter of the work machine, wherein derating the at least one operational parameter comprises decreasing a velocity of a work implement of the work machine.

16. A method comprising, by a controller in a work machine:

maintaining a signal map within a memory of the controller;

determining whether the work machine is approaching a new geographical location;

based on determining that the work machine is approaching the new geographical location, derating at least one operational parameter of the work machine;

determining that the work machine has entered the new geographical location;

detecting an actual signal quality within the new geographical location;

determining whether the actual signal quality satisfies one or more rerating criteria;

based on determining that the actual signal quality satisfies at least one of the one or more rerating criteria, rerating the at least one operational parameter of the work machine; and modifying the signal map based on the actual signal quality.

17. The method of claim 16, wherein derating the at least one operational parameter comprises decreasing a maximum available gear of a transmission of the work machine.

18. The method of claim 16, wherein derating the at least one operational parameter comprises decreasing a maximum speed or propulsion of the work machine.

19. The method of claim 16, wherein derating the at least one operational parameter comprises decreasing a maximum available gear of a transmission of the work machine.

20. The method of claim 16, wherein derating the at least one operational parameter comprises decreasing a maximum rim-pull of the work machine.

* * * * *